(12) United States Patent
Xu

(10) Patent No.: US 9,539,516 B2
(45) Date of Patent: *Jan. 10, 2017

(54) GAMING METHOD IN RESOURCE AND ACTION BASED VIRTUAL COMMUNITIES

(71) Applicant: Yongyong Xu, Sunnyvale, CA (US)

(72) Inventor: Yongyong Xu, Sunnyvale, CA (US)

(73) Assignee: Yongyong Xu, Sunnyvale, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/276,924

(22) Filed: May 13, 2014

(65) Prior Publication Data

US 2015/0328546 A1 Nov. 19, 2015

(51) Int. Cl.
| | |
|---|---|
| A63F 9/00 | (2006.01) |
| A63F 13/795 | (2014.01) |
| A63F 13/35 | (2014.01) |
| H04L 29/08 | (2006.01) |
| G06Q 30/02 | (2012.01) |
| A63F 13/63 | (2014.01) |
| A63F 13/847 | (2014.01) |
| A63F 13/335 | (2014.01) |
| H04W 4/20 | (2009.01) |
| H04L 29/06 | (2006.01) |

(52) U.S. Cl.
CPC ............ *A63F 13/795* (2014.09); *A63F 13/335* (2014.09); *A63F 13/35* (2014.09); *A63F 13/63* (2014.09); *A63F 13/847* (2014.09); *G06Q 30/02* (2013.01); *H04L 67/22* (2013.01); *H04L 67/38* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 6,102,406 A * | 8/2000 | Miles ...................... | A63F 9/183 273/430 |
| 6,352,479 B1 * | 3/2002 | Sparks, II ............... | A63F 13/12 463/29 |
| 6,425,012 B1 * | 7/2002 | Trovato .............. | H04L 12/1818 348/E7.071 |
| 6,476,830 B1 * | 11/2002 | Farmer .................. | G06N 3/006 705/27.1 |
| 8,202,159 B1 * | 6/2012 | Ocko ...................... | A63F 13/10 463/25 |
| 8,758,139 B1 * | 6/2014 | Xu ........................ | H04W 4/206 463/42 |
| 9,087,020 B1 * | 7/2015 | Amacker .............. | G06F 15/167 |
| 2002/0097267 A1 * | 7/2002 | Dinan ..................... | H04L 29/06 715/757 |
| 2003/0028595 A1 * | 2/2003 | Vogt ....................... | G06Q 10/10 709/204 |
| 2003/0096621 A1 * | 5/2003 | Jana ..................... | G08G 1/0104 455/456.1 |

(Continued)

*Primary Examiner* — Seng H Lim

(57) ABSTRACT

A method for providing an activity involving a plurality of users in a plurality of virtual communities is disclosed. The method includes the steps of (a) creating the plurality of virtual communities based on the resources accessed or actions taken by the plurality of users, (b) keeping track of each of the plurality of user's resources accessed or actions performed, and (c) enabling the activity based on the resources visited and actions performed by each of the plurality of users.

18 Claims, 2 Drawing Sheets

(56) References Cited

U.S. PATENT DOCUMENTS

| | | | | |
|---|---|---|---|---|
| 2004/0097287 A1* | 5/2004 | Postrel | ................... | G07F 17/32 463/41 |
| 2005/0137015 A1* | 6/2005 | Rogers | ................... | A63F 13/12 463/42 |
| 2007/0049371 A1* | 3/2007 | Yang | ...................... | A63F 13/12 463/16 |
| 2011/0250940 A1* | 10/2011 | Tsai | ...................... | A63F 13/12 463/9 |

* cited by examiner

GAMING METHOD IN RESOURCE AND ACTION BASED VIRTUAL COMMUNITIES

CROSS REFERENCE TO RELATED APPLICATIONS

The present application is a continuation application filed under 35 U.S.C. 120 of application Ser. No. 11/543,368, filed on Oct. 3, 2006 and entitled "Gaming method in resource and action based virtual communities", which is now allowed, the entire disclosure of which is herein incorporated by reference. The present application claims priority under 35 U.S.C. 119(e) from provisional patent application Ser. No. 60/596,536, entitled "Methods of multi-user games for resource and action based communities", filed on Oct. 3, 2005, the disclosure of which is herein incorporated by reference in its entirety.

BACKGROUND OF THE INVENTION

1. Field of the Invention

The present invention relates to online virtual communities and more particularly to gaming methods in resource and action based virtual communities.

2. Description of Related Art

Recently, a new form of marketing and advertising has found its way to the Internet. This new form of marketing and advertising model involves large numbers of online users and makes use of a scavenger hunt model, or requires users who watch particular TV shows or movies to go online to search for answers for predefined questions and compete to determine the winners.

Most of these sites sponsor a treasure or scavenger hunt in which participants are asked to provide answers to questions, while others make use of a spy series, for example, and requires users to guess what a character will do in the upcoming show. For example, one such advertising site may be found at www.internettreasurehunt.com. One of the TV show is the spy drama series—Spooks by BBC broadcast in 2002 and another one is ABC's spy drama series, Alias broadcast in November, 2001. Those two types of games have one thing in common. They both involve large numbers of multiple users who participate in the game by browsing web sites for answers.

Another type of activity involving large numbers of multiple users includes online games. With the popularity of Internet games beginning with the original text based MUD (multi user games) to recent more advanced 3D online adventures or other online games, more and more people have become connected to the virtual world offered by online games. For example, in China one of the online games vendors, ShenDa has over half a million people playing together. To play such games, users need to install client software and also pay subscription fees in order to connect to the vendors' game servers.

All the above activities require users in the Internet to use dedicated time to participate and enroll in the event or game. For example, when playing online games, users are focusing only on the game and cannot spare time for other work. As such, users cannot play games and enjoy other activities such as web surfing concurrently.

Virtual communities based on resources users are currently accessing or actions users are performing as disclosed in my co-pending application Ser. No. 10/710,964 and 60/596524. Virtual communities connect people around the world together while they are accessing the same resource or conducting the same or similar activities. A user uses a regular web browser to connect to the Internet and a browser plug-in or helper object connects to the virtual communities based on the resource the user is accessing or actions or behaviors the user has taken or been engaged in so that the user is able to connect with all others who are also accessing the same resource at the same time or performing the same actions. Virtual community members can communicate and collaborate together including chatting, sharing information, asking for help or exchanging ideas. It is also another type of peer to peer technology in the Internet.

A virtual community server or servers serve the virtual communities. Everyone who participates is assigned a unique user id and has installed a client side program, browser plug-in, or helper object that is responsible for communicating with the community servers while the user is accessing web resources or services. The virtual communities based on resources or actions can further be grouped together to allow more users who are visiting groups of web resources to connect and communicate to each other. During this process, users' privacy will be strictly protected under all conditions although user's web access information is transferred to the virtual community servers and may even be persisted for some time with users' permission.

Prior art game systems and methods are well known in the art. U.S. Pat. No. 6,102,406 to Miles et al. entitled "Internet-based advertising scheme employing scavenger hunt metaphor" disclose an Internet-based service configured to operate a scavenger hunt in which participants are required to answer questions using information obtained from one or more Web sites visited in response to hints suggesting where such information may be located. Each preceding question must be successfully answered before a next question is presented. Generally, a correct answer requires verification that a respondent visited the Web site at which the information required in the answer is located. This, in turn, may require that the respondent reached the Web site at which the information required in the answer is located through an authorized path including at least one predetermined Web address. This patent discloses a web based scavenger hunt game. The disclosed games does not involve interaction and collaboration among community members.

United States Patent Application Publication No. 20040097287 to Postrel entitled "Method and system for gaming over a computer network" discloses a networked, online gaming system and method of operation. The system includes a plurality of players, each operating a game playing computer interconnected over a network with a gaming server computer. The gaming server computer generates a profile for each of the players, which may include the player's gaming proficiency, and socioeconomic and physical data of the player. The gaming server computer matches the players (as teammates or opponents) to play a game based on the profile of the players, supervises the game played by the matched players, modifies controllable parameters of the game being played, and manages a reward point account provided for each player. This patent application talks about matching players to player games based on their profiles, and does not relate to matching players based on their web interests and activities.

The publication "I Want My MMOE-TV!" disclosed at http://www.mssv.net/archives/000072.shtml on Sep. 12, 2004 discloses mmoe—massively multiuser online entertainment that was done in May 2002 on the BBC's spy drama series, Spooks. Run by the Fictionlab department of the BBC, the game will involve players sifting through clues on an MI5 'extranet' website among others, and of course watching the TV show to pick up additional hints. It will take place in real time—although in practice what this means remains to be seen—and will last for seven weeks. It also mentioned the success of Microsoft's Al web marketing campaign by running an interactive online game alongside the TV. It also discussed different categories of MMOE with TV and movie combinations—one or two way, transparent or significant. The publication discusses interactivity between a TV show and its own audience. It does not relate to a system that may involve all people who are using the Internet and allow participation in real-time of multi-user games at the same time the users are browsing the Internet.

U.S. Pat. No. 6,676,521 to La Mura et al. entitled "Enhanced online game mechanisms" discloses a method of providing interactive online communication through a network comprising creating a population from a plurality of network participants in which the said participants are operatively coupled to participate in a game, then selecting a sub-population from the population based upon some pre-selected criteria, inviting the population to said game and receiving a confirmation from said sub-population. This patent relates to enhanced, online community game systems. It discloses an interface module operatively coupled for communication with a transaction handler. The system is not based upon dynamic, resource based virtual communities.

U.S. Pat. No. 6,352,479 to Sparks, II, entitled "Interactive gaming server and online community forum" discloses a multiplayer game system implemented over the WWW using a plurality of game servers dynamically linked to and controlled by a WWW server. The WWW server dynamically links game players who log on to a web site hosted by the WWW server as a function of game playing statistics for each game player which are stored in the WWW server. The game servers generate the game player statistics for each player during and/or after game play and upload the game player statistics to the WWW server. The WWW server matches game players to appropriate games currently being played on the game servers based on the skill level required by the game and the corresponding skill levels of other current players of that game as represented by the game player statistics stored by the WWW server and dynamically generates links for the game player to the appropriate games. The user can then select which game to play by choosing one of the dynamically generated links. This patent relates to how to implement a game server with a WWW server. It requires all game players to log on to the particular www server in order to play.

United States Patent Application Publication No. 20040249811 to Shostack et al. entitled "Web based dating service with filter for filtering potential friends/mates using physical and/or personality attractiveness criteria" discloses a dating related web site incorporating a number of services of interest to subscribers seeking a compatible mate or friend. A would-be subscriber first specifies profile information including authentication information, information relating to qualities desired in a friend and mate, and a screen image icon. The profile information is stored in a database associated with a web server hosting the dating site. The subscriber can then log onto the site and take advantage of chat room environments featured at the site. Rooms are hierarchically organized into lobbies and sub-lobbies corresponding to topics and sub-topics of discussion. In addition, the lobby and sub-lobby screens indicate the concentration of compatible participants in the rooms of corresponding lobbies and sub-lobbies, thus allowing easy navigation to a desirable room.

United States Patent Application Publication No. 20040260781 to Shostack et al. entitled "Web based dating service with weighted interests matching" discloses a dating related web site incorporating a number of services of interest to subscribers seeking a compatible mate or friend. A would-be subscriber first specifies profile information including authentication information, information relating to qualities desired in a friend and mate, the relative importance of the respective categories, and a screen image icon. The profile information is stored in a database associate with a web server hosting the dating site. The subscriber can then log onto the site and advantage the of chat room environments featured at the site. Rooms are hierarchically organized into lobbies and sub-lobbies corresponding to topics and sub-topics of discussion. In addition, the lobby and sub-lobby screens indicate the concentration of compatible participants in the rooms of corresponding lobbies and sub-lobbies, thus allowing easy navigation to a desirable room.

The above two patent applications disclose automatic navigation allowing the user to find a chat room with compatible participants automatically once a sub-lobby is selected and support "virtual date". In addition "Physical Attractiveness" and/or "personality attractiveness" criteria also permit the subscriber to screen members in the database based on community ratings of the physical attractiveness and/or personality attractiveness of the members. These applications do not provide a date matching based on user's normal web browsing behaviors.

United States Patent Application Publication No. 20050024488 to Borg entitled "Distributed immersive entertainment system" discloses a multi-camera high-definition Point of Capture (POC) and Point Of Display (POD) controlled using a graphically based tool called the LightPiano. There is extensive use of the Worldwide Web for both local and remote access to the chat, fan clubs, SMS and instant messaging systems, as well as for online access for customers to view scheduling, and purchase ticketing, webcasts and archive access. The Web is also used by the venue owner to manage the entire system for booking, data mining, scheduling, ticketing, webcasting, and facilities management. The Web interface combined with the power of the LightPiano makes this complex interrelated system relatively easy and intuitive to operate. It significantly lowers the cost of operation and makes the system scalable to a large network of POCs and PODs. It allows one POC to feed many PODs, enabling a truly global distributed, immersive entertainment environment. This patent focuses on a distributed entertainment environment and not on how users of the communities can interact and participate with others in the game.

United States Patent Application Publication No. 20010034661 to Ferreira entitled "Methods and systems for presenting a virtual representation of a real city" discloses methods and systems in which users may navigate among a virtual representation of a real region, such as a city. The interface may include images of actual city blocks that have interactive items of interest such as storefronts. Users may virtually shop in the stores that adorn the virtual city blocks. The virtual city application may process orders for all merchants—local or web-based. An artificial intelligence component may be used in the form of a back-end linear programming model to provide an intelligent personal assistant. Chore-management may thus be automated. This application discusses virtual cities which could also be regarded as one type of virtual community but does not relate to a multi-user game which is based on users browsing the Internet.

United States Patent Application Publication No. 20040044567 to Willis entitled "Gaming service provider advertising system" discloses a method of advertising for use by a Gaming Service Provider providing a customer gaming console in connection with a wide area network. The method includes the steps of providing an identification from the customer gaming console to a Gaming Service Provider downloading an advertisement out of a plurality of advertisements to the customer gaming console, initializing the customer gaming console for playing a game and for displaying the advertisement, playing a game on the customer gaming console, and displaying the advertisement on the customer gaming console, when the game is not being played. Alternatively, the steps of the method are not initialized by the Gaming service provider, but from the gaming console site. Further, certain games played on the gaming console incorporate advertisements into their gaming environments. This patent relates to a method of conveying and displaying ads to users.

What is needed then is a system and method of providing a game in resource and/or action based virtual communities. What is also needed is a system and method of providing a game that allows players to simultaneously play the game and perform other non-game activities. What is further needed is a system and method of providing a game that can be played implicitly by players engaging in normal browsing or other activities. What is further needed is a system and method of providing a game in which the game is distributed across multiple virtual communities spread across the Internet. What is also needed is a system and method of providing a matching game that matches participants based on the participants' interests and activities and the system automatically and dynamically creates and updates participants' profiles.

SUMMARY OF THE INVENTION

The system and method of the invention resolve the problems of prior art by providing a gaming method based on resource and/or action based virtual communities. The gaming method may include a matching game or activity, a competitive game involving teams, a scavenger hunt game, and a cooperative game.

In this patent application we are disclosing a new type of Internet campaign and real world game system that allows users to play games and enjoy fun throughout and along with their regular online activities such as surfing the web, using any software. The game is based on the resource and/or action based communities as disclosed in patent application Ser. No. 10/710,964 filed on Aug. 15, 2004, and provisional patent application Ser. No. 60/596,524 filed on Sep. 30, 2005.

Now, any user who is accessing the resources or services is part of various communities based on those resources and services. In addition to participate regular community activities such as posting comments, sharing information, they can also play games. Actually, any game that involves multiple users can also be deployed in these communities that people can choose several partners and play together. Now, on top of this virtual community system, many new type of multi-user game systems can be deployed which differs from traditional multi-user games in that it may span multiple communities. Almost all traditional online games are specific to a particular community—for example, one user who plays an online game has to stick to that game during the whole game process. Different from those game systems, during our game progress, users may already participated thousands of different communities corresponding to thousands of resources or services they have accessed In accordance with an aspect of the invention, a method for providing an activity involving a plurality of users in a plurality of virtual communities includes the steps of (a) creating the plurality of virtual communities based on the resources accessed or actions taken by the plurality of users, (b) keeping track of each of the plurality of user's resources accessed or actions performed, and (c) enabling the activity based on the resources visited and actions performed by each of the plurality of users.

In accordance with another aspect of the invention, a method of automatically creating a user profile within a resource based or action based virtual community includes the steps of (a) creating the plurality of virtual communities based on the resources accessed or actions taken by the user, (b) keeping track of each of the resources accessed or actions performed by the user, and (c) creating the user profile based on the tracked resources accessed and actions performed.

In accordance with yet another aspect of the invention, a system for providing an activity involving a plurality of users in a plurality of virtual communities includes a virtual community server operable to create the plurality of virtual communities based on the resources accessed or actions taken by the plurality of users, keep track of each of the plurality of user's resources accessed or actions performed, and enable the activity based on the resources visited and actions performed by each of the plurality of users.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of functional components and to the arrangements of these components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

The first game is related to dating, making friends or online matching. In other words, the purpose is to let the community server find best matches from among all of the participants in the game. The game consists of the following: one or more candidates looking for a friend, partner or spouse; multiple participants who use the virtual communities during their daily online life; and optionally, viewers or an audience of the game. They are optional since most of the time, the audience can also be the game participants unless others in the Internet do not want to participate in the game but still want to watch the process of the game. Anyway, the game can also be broadcast over the Internet or other media such as radio or TV. At the end of the game, one of the participants will be chosen as the target (friend, partner, spouse or mate) for the candidate who has the best match for the candidate(s) on their interests, actions or behaviors. Of course, if looking for a spouse or mate, the candidates must be of the opposite sex.

Figure 1:
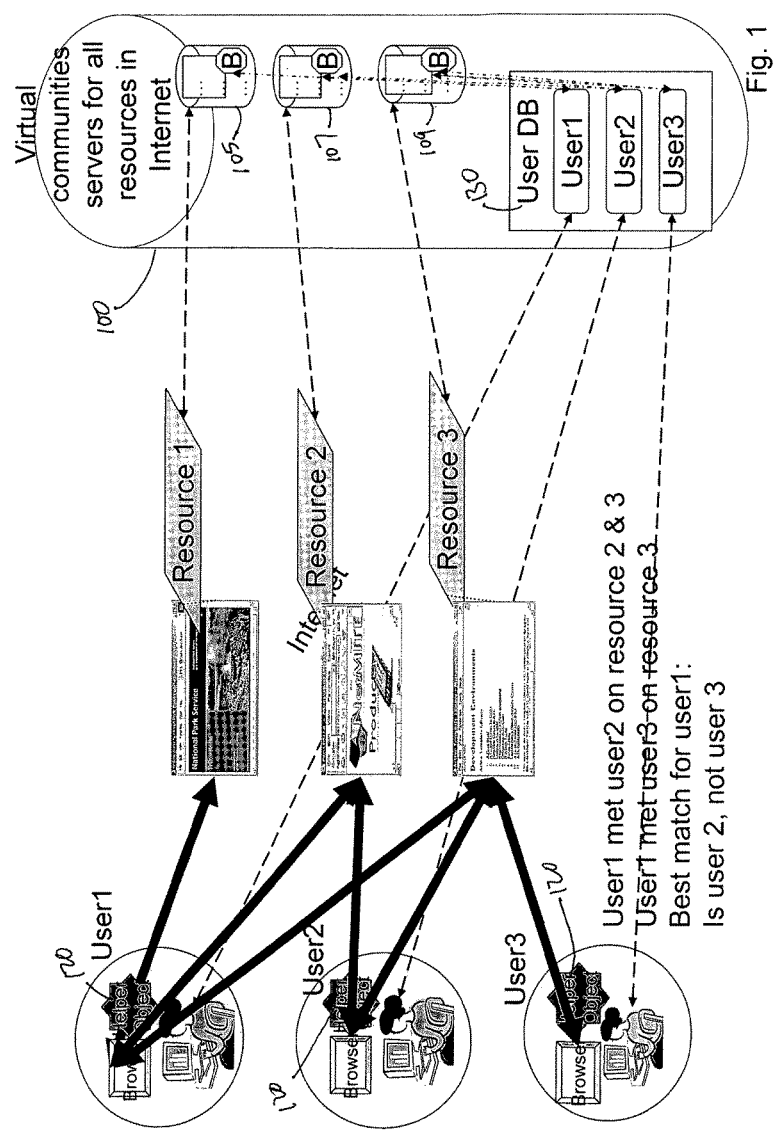
FIG. 1 is a schematic representation of a matching game using a resource based virtual community in accordance with the invention.

With reference to FIG. 1, participant's user1, user2 and user3 are participating in a matching game based on resource based virtual communities. User1 has accessed resource 1, resource 2, and resource 3. User2 has accessed resource 2 and resource 3. User 3 has accessed only resource 3. A virtual community server 100 renders the virtual communities 105, 107, and 109 based on the accessed resources to user1, user2, and user3 utilizing plug-ins or helper objects 120 installed on the users' machines. Virtual community server 100 includes a database 130 in which the resources accessed by each user are stored. In this example, the best match is between user1 and user2 because user1 virtually meets, or shares the same interest with user2 on resource 1 and resource 2. User1 and user3 only virtually meet on resource 3 and user2 and user3 only virtually meet on resource 3.

The game can be hosted in the virtual community servers which also contain a match engine operable to find the best matches among users for the resources or actions they have accessed. The organizer of the game may set up the game to be either open to all virtual community users for free or closed to only those who have paid a subscription fee. In the latter case, only those who have paid the subscription fee will be enabled to participate in the game while others can only watch the game but cannot participate. This can be easily achieved to set a special paid and participation attribute in those paid user's profiles inside the virtual community servers. Every time a user visits the virtual community server, the server checks that flag to decide if this person is a participant and return additional information for the participants.

The game may be a recurring event and may also have a start date and deadline for each session. During the period of one session, the candidate will have a fixed time that he will be on line in the virtual communities. He can freely surf the Internet and do his own job as long as he will connect to all the virtual communities based on the resource or actions he has accessed. Meanwhile, all the other participants can also do whatever they want in the Internet and nothing more, as long as they all participate in the virtual communities for resources or actions they taken. Of course, during this period, all participants, including the candidate must have granted the permission for the virtual community servers to analyze or store their web access log for matching. Of course, during this process and event, all users' web access logs will be kept strictly confidential and will be removed after the event.

While a user is accessing the Internet resource or performing some action, the user is also automatically connected to the virtual community based on that resource or action. The community server will return to the user the home page of the virtual community so he can collaborate with others. Meanwhile, the virtual community can also keep track of how many users or which users have met in such web resource. In normal situations, to preserve the privacy of users, that kind of information may not be available or even persisted. However, in order to play the dating game, the server needs the user's permission to analyze his web access information for a match with the other candidates, which may happen at the end of the game. It is also allowable for a participant to hide or shield some resource access or action performed that they do not want the server to analyze or record, or they can set a time window for allowing the search for the match—for example, during day time, it is Ok for the match but at night, it is their private time and they do not want to participate in this game. However, in order have fun with the game, users should let the system analyze the majority of their access log. The goal of the game is to find the best matches for two persons in the Internet. Of course, at the end of the game cycle, all users' personal access information or log shall be removed.

During the process or at the end of the game, the system will automatically scan and analyze all participants' resource access or action logs and compare it with the candidates' resource access or action log and try to find the best matches. The match can be based on the web sites they have accessed, and may or may not depend on time they are accessed (day or night), how frequent or how long it has been accessed (simply open, close or spent lots time there) or even the categories of the web site (what kind of newspaper he is reading—technical or finance). The rules can be defined any time as long as they are the same for all the participants.

In another words, any participants surfing the Internet who have the most similarity to the candidate(s) must be a good match for the candidate(s), at least in view of their interests or online behavior. For example, if both people spend lots of time reading the Wall Street Journal, travel stories, or Stephen King's horror novels, there are much more chances that they have many things in common to share. It must be easier for them to communicate to each other. Even it is not the case for some situation, at least, the system has successfully found a person whose online behavior is most similar to the candidate from thousands or even millions of participants. This kind of searching for "mini-me" is also a fun game.

This method of tracking and analyzing user's activities has an additional usage, that is, it can reveal the user's real interests or behaviors so that it can be used to automatically create a user's profile without the user's intervention. This profile-less process could be used for matching, dating or in other social networking areas. For example, by analyzing all web pages a user visits daily, or by analyzing a user's web browser history, a tag cloud of the keywords of the contents he has accessed can be created by the system. This further can be shared or matched with other people as well. Of course, the user may have control over how or when it is done.

To add more fun, the candidates could also utilize the facilities and services provided by the virtual community systems to collaborate with others and also find some match for him or herself. For example, whenever the candidate visits a new web site, he could chat with others either publicly or privately; he could also try to publish his comments to the community for some resources he is accessing or help answer questions from others. During this process, he can find a match for himself before the deadline. The rule may prevent the candidate from telling others beforehand which web resources he is going to visit—otherwise, it may mislead others participants. Although the candidate can make friends in the community himself, he cannot disclose his own mission. At the end of the game, the audiences shall have the chance to compare the person selected by the candidate himself with the person selected by the system. And if they are different, the two could have competed again, in whatever means.

To further increase the pleasure of the game and attract more attention from viewers or the audience, the candidate(s) can be assigned some tasks such as scavenger hunt—to find answers to some questions, dig out some secrets or to make some money in the Internet. Periodically, the game will publish the progress of the candidate or even broadcast in real time to all the viewers of this game what tasks the candidate has already finished through a TV show or Internet broadcasting. Meanwhile, any type of community games for the Internet can be used to enhance viewers' attention in the progress of the game.

Also during the process of the game, the game organizer or the server can advertise or market the virtual community server system to the public or the viewers. Advertisement targeted to viewers, audience, and participants can be delivered by the community server in corresponding community home pages. Furthermore, there can be some competent games for all the communities who participate in the game or viewers who watch the game and ask them to earn the opportunity to earn some money, like lottery, answering questions or even compete by groups, like the apprentice TV show.

A variation of the game would be that the system finds top 10 matches for the candidate(s) and then lets the candidate(s) further interview them face-to-face later. Or, they can play a second round to select the best match from among those matches. One example of this second round includes asking players to guess which Internet resource or action the candidate(s) will access and try to meet him in the virtual community of that resource or action. Many other competing games can also be applied.

During the whole process of the game, the user id of the candidate(s) may be hidden or invisible so that nobody else can cheat by peeking or sending the candidate(s) private instant messages unrelated to the game. The candidate(s) also cannot talk secretly with anybody else about what he is doing or going to do to prevent cheating. Fair and open play is an important factor for this game. Also at the end of the game, if possible, there could also be multiple winners for the same or multiple candidates.

Yet another variation of the game would be that there are no candidates at all—it is like a free matching among the users in the virtual community system and the system will automatically find matches among all the users. For example, for some period, the system can find the top 10 matched pairs automatically among those participants and further invite them for more competition or interviews on other media including TV show or Internet show. One shortcoming of such a free matching game is that it is hard to prevent users from cheating. For example, a husband and wife can arrange beforehand that they will always go to the same site in order to get a 100% match to compete for prize. In the open Internet world, there is no really good mechanism to prevent users to talk through secret and separate channels offline.

However, when there is no prize to compete for, this form of game can become a complete fun or entertainment game for anyone in the Internet to search for the "mini-me"—another person on the planet who would access the same or similar resources or whose behaviors is most similar to the user. This game can be a new type of dating service—people are getting matched because they accessed similar resources or conducted similar actions during their online life.

While any user is surfing the Internet, the user is accessing some resources or performing actions with some services, meanwhile, he is also connected to the communities based on the resource or action accessed. In each community he can participate in a collaborative way with other community members, such as asking or answering questions, writing comments, and chatting with others. While browsing each virtual community home page, the user can see how many other users are also online accessing this resource or doing the same action. And if he has met one single person (or user id) too many times in many different locations (resources or actions), there is a good chance for him to know that this person probably has more common interests with himself and he may start chatting with him or her in order to understand more or develop a deeper relationship.

Of course, it may be difficult for the user to keep track of how many times he has "met" with another person in the same community based on the some resource he has accessed before. In these cases, the virtual communities can provide such help or services that automatically track how many times any two persons (or user ids) have appeared in the same resource or action based communities. Later, when a new user accesses a resource or action based community, the virtual community can display the active user names of the current community. In addition, the virtual community can also calculate the number of "encounters" of each user to the new user and display that number in the new user's virtual community home page, say, next to the user's name columns of the user list. In this way, the new user can immediately know which user he has encountered most or the most familiar user id and which one is just a new encounter.

This feature can be implemented solely in the virtual communities' server side and does not need any special handling from the client side browser plug-in or helper object since the server already knows each time how many users are accessing the same resource or actions. A matrix to store how many times two users have met each other, and optionally, in which resources, may be added to the community server. And two people can use this method to start making friends or even dating once they have enough matches.

No doubt that privacy will be an important consideration in that this feature should be turned on by both people if they want to use this feature to find good friends during their regular online life. If, for example, one user does not want to be visible to others, or a particular user, the system should honor his choice and not add his user id to the newcomers' encounter numbers. Also, one person's access or action history cannot be released without the owner's permission.

Since the virtual communities systems may be an open system to anyone in the Internet, security both inside and outside the Internet may be an issue since one person can pretend to be a completely different person. A sort of credit for users in these virtual communities can be set up so that before one person wants to talk or meet privately with another user in the system, he or she can check the credit for that person first. Although not a 100% safe guard, the credit can be at least an additional insurance for a person to meet another one he has completely unfamiliar in real world.

The credit can be either real world credit system if the system has ways to verify that user through offline credit system, or online community credit through that person's online activities. In the latter case, in all the virtual communities, the system may allow anyone to rank any other users through their activities in the community. For instance, if one person has helped many others through his collaboration in a community, he can earn lots of credit and if many people do not like what he did (comments, discussions, or even harassment to other members), his credit could be bad. This credit system at the same time allows users to know who is to be trusted, and also encourages a more encouraging, helpful and active ecosystem for the whole virtual community systems. Needless to say, this credit system is not a perfect replacement for real world credit system as anyone can pretend or cheat in the virtual world of the Internet.

All the above games, including the dating game have no special requirements for the participants except that they should participate in the resource or action based communities during their normal online life such as web surfing. The virtual community system will automatically do the work of matching for the users and either select winners or allow the users to select the one among many matches.

Now, a second game may require the users to pay more attention to what has happened in the resource or action based communities while they are accessing the resource and connected to the community. Similar to the above-mentioned games, this second game also allows all users inside all different virtual communities to participate. In this game, all participants can be divided into two or more teams. All members of the team must try to be on line during the play time and also connect the resource or action based virtual communities while they are online. The other requirement for the users is that they shall not hide their existence or become invisible while they are online—even though the normal virtual community servers provides the option to members to be invisible during web browsing or surfing in order to protect privacy. For this game, if everyone runs in invisible mode, the game becomes meaningless. The multiple teams of participants will compete in a sort of "catch and run" game and there is no limit for the number of participants in each team—it can contain many people, even thousands of users, as long as they are part of the globally resource or action based virtual communities.

Figure 2:
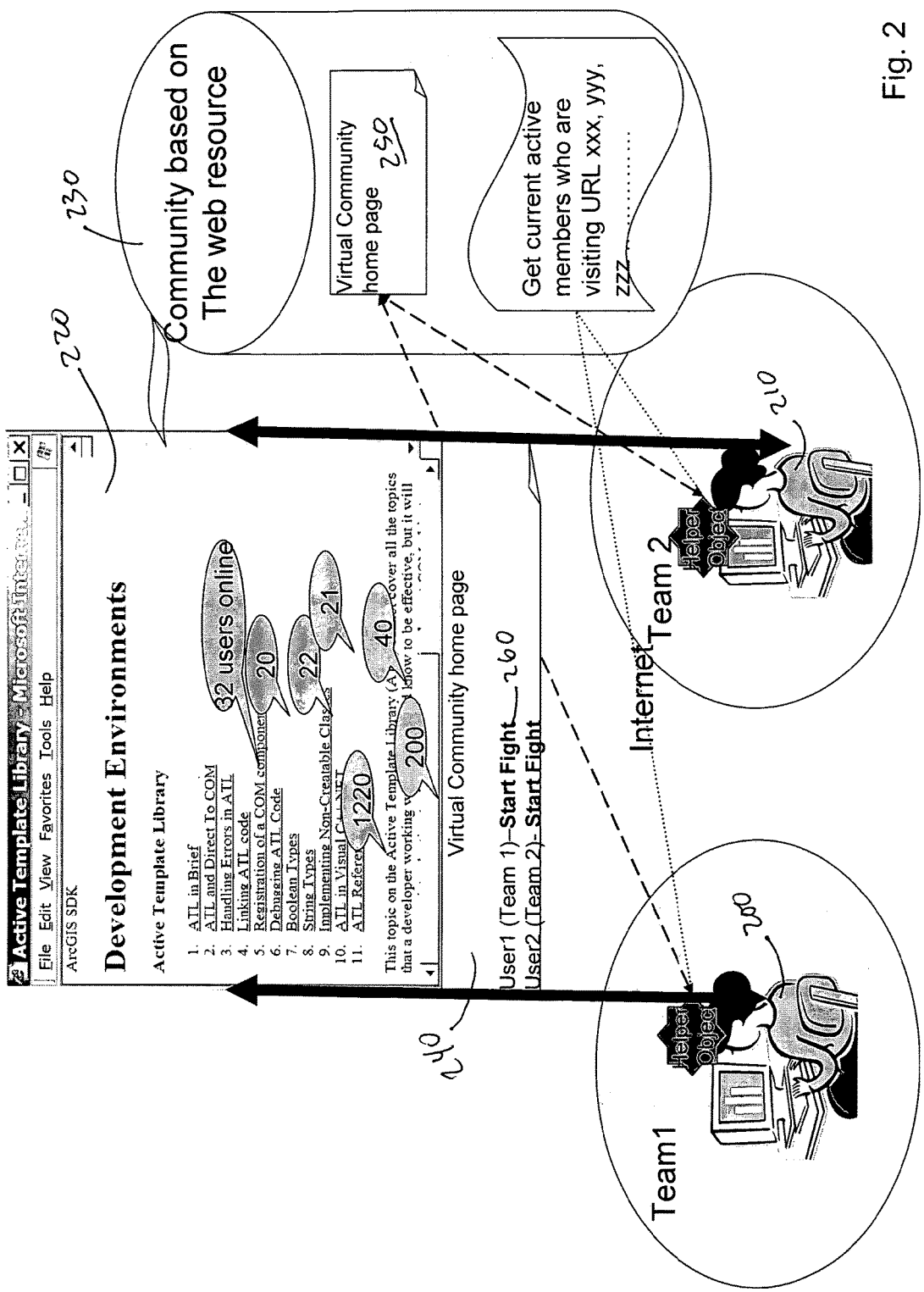
FIG. 2 is a schematic representation of a competitive game using an action based virtual community in accordance with the invention.

With reference to FIG. 2, Team 1 and Team 2 are playing a game in which the teams may be fighting each other. A member 200 of Team 1 and a member 210 of Team 2 are accessing or performing a same action on resource 220. A virtual community server 230 renders virtual community services including a virtual community home page 250 associated with the resource 220. Content of the home page 250 includes number of users currently accessing the resource 220 and provides a capability 260 for users to participate in the game, including fighting each other.

This game starts with a set of predefined tasks or questions that each team needs to finish before the end of game; some of the tasks may require a certain level of collaboration within the team. Before the game starts, the virtual community may assign every participant to the right group and the server is responsible for maintaining the balance of people among the teams. After the game starts, all participants will surf the web as normal and try to search for the predefined tasks or answers of the questions assigned to their team. Once a user solves one of the tasks or answers the question, he could be awarded some credits, which allows him to "kill" some person from the opposite team once the credit reaches some threshold. The word "kill" in here can mean different things under different rules. For example, it may disallow people from the other team from being able to answer more questions or only reduce the credits for those members. In some cases, once "killed", the person cannot answer more questions. Under some other rules, the people may be revived after some period or after answering some questions. At the end of game, whichever team that contains the most un-killed participants or most credits will be the winner.

Every time a participant connects to the virtual community while he is accessing some web resource or doing some task, the system will display all the other participants in the same community based on that resource or action. During this game, the system may also let him know whether the other participants are from his own team or from the other team to prevent him from killing his own team. Once he has earned enough credits, the system will provide him a special link in the community to start "killing" members of the other team he has encountered in the same community. In case both persons have credits, the killing process could be either automatic by comparing the credit level of the two members or manually done by some other interesting combat or text game.

In summary, after the fight, the one who is killed will be declared dead for a certain time—might be until the end of game. Under some rules, unless the system allows them to be "revived" after a certain time, he cannot continue to play the game. However, the killer may also lose some credit during the "battle" and may be vulnerable to being killed before he regains more credit. The system may limit the fighting or killing to only happen when both people are accessing the same resource or taking the same actions and being connected to the same community at the same time.

The "battle" between two people can be designed by the system to make it more pleasurable. For example, when two users see each other at the same time, the one who is well prepared and starts the killing or fighting process may take the advantage that it can kill the other with less credit loss—except the enemy is more powerful—having much more credit than him. In that case, the killer must have been killed by the enemy.

Furthermore, those who are on the same team can form different types of groups or sub groups and the killing can happen between two groups. Many online games allow such kind of group combat and those methods can be utilized in this game too. This is the first time people who are accessing the Internet can spare some of their time to play games in different dynamic communities. The challenge and purpose for a single player is to find and answer questions to accumulate more credits earlier and then locate the resource his opposite group are likely to access and then kill the enemies there. Another purpose of the player is to help each other from the same team and unite together as groups so they can kill more powerful enemies. If needed the system may allow people to transfer credits to each other.

To help one player to locate the resource the other team is most likely to access, each team may leave some hints such as answers to the questions, or progress of tasks they have to finish, help requests or other information related to the tasks in the community. This could be done by leaving messages in the special game comments area in the virtual communities for each resource accessed and players can carefully read those comments to find out those hints and then follow the instructions in order to earn more credits or kill more enemies while they are surfing or running over the Internet.

During the game, new members can also join and leave freely as long as the balance of all the teams is still maintained. Because this is a massive multi-user game and there are thousands or more users playing at the same time, it does not matter if some people cannot participate for various reasons as long as there are still enough people playing it during the game time. Anyway, since this game can be played along with their online life and does not take too much of their daily time, they can play it any time— either at work or at home At the end of this game, the team which answers more questions and contains more survivors or more credits will be declared as the winner team and each team member may also be awarded.

To add more fun to the game, the game can take the form of many existing online games. For example, instead of relying of credits, the game can behave like an online RPG or strategy game and assign different attributes to each user and ask them try to improve their attributes or level themselves. However, unlike traditional online games where people have to kill each other to gain experience points, the disclosed game allows the user to gain experience while they are surfing the Internet. In additional, team members could organize together to form different groups for fighting. Communications within the team through various means of the virtual communities are encouraged. Different members in the group can also negotiate strategies if they work in a more collaborative way to gain credits and kill enemies. Also, different variations of the game can be developed and applied to enhance the game. For example, allowing people to exchange credits inside the group may eventually form a trade market. Other means of collaboration in the virtual communities can also be used. Whatever ways to go, people can enjoy the fun by communicating with many more people who are also accessing the same resource or conducting the same operations.

The above two types of games allow users to enjoy the benefit of resource or action based virtual communities by playing games or competition along with their daily online life such as surfing the Internet. Collaboration is needed but is not essential to the success of the games since it is more like a statistical effect. Now, a third game requires all the users or participants to collaborate more tightly in order to succeed in the competition.

In this game, all participants are still divided into two or more teams. This game is more like a survivor or apprentice game. Each team will be given certain collaborative tasks that require all team members to utilize the resource or action based communities to work closely together on a dedicated task and finish the work excellently and at the end, either group of judges or all users in this virtual communities system will vote for the winner of the day and be awarded.

And the loser team will be punished. The punishment could vary from eliminating one of the core members by voting from the team members or by the audience or any other online punishment that applies to each member.

This game differs from the second game in that the smaller tasks are assigned to each team each day and on each day, the goal is very clear and the result can be seen immediately at the end of day. However, in order to finish the task, it may require more collaboration among the team members and they must utilize all different collaboration mechanisms in the community system to contribute and share more in order to win the game.

For example, one task would be to design a new graphical interface for a particular web page. If the virtual community servers supports modification and propagating the web content on the fly (as disclosed in co-pending patent application Ser. No. 60/596,165), all team members could collaborate together and modify the web page one by one and after a certain time, the final result of the modified web page can be evaluated by judges or audiences to see which one is better.

Another sample task would be to modify an English paper or essay for a college student. In this case, all team members have to access the web page containing that web resource and also connect to the virtual community based on that web page. From then on they can exchange ideas in the form of comments, discussions or real time chatting on how to modify it to make it better. They can also inject comments directly into the essay if the virtual community supports it. After all are done, the new essay could either be rejected or accepted by the original author and either the author or audiences can decide the result.

A third sample task would be to ask the team members to set up a web site and see which team attracts more visitors to the web site or to the community based on that resource. All team members can contribute to this task by asking their connections like friends, family members to access the web site and join the virtual community based on that resource. They can also try to improve the quality of the web sites, provide more useful services or post more advertisements somewhere so it can attract more attention from other Internet users all over the world.

It is also important that in this game, every participant can contribute or demonstrate his ability or capability. Actually, all participants already belong to an action based virtual community based on the tasks being work on. If the punishment of the losing team is to remove a person, at the end of one session, the team members or the audience may vote to eliminate whoever they think is useless or does not contribute enough. Also during this game, project managers may be appointed for better management of the project—all people can choose a pure democratic way—vote for all decisions made. This is up to the team to decide. The purpose of the game is to test if the team can really collaborate in a scattered environment while their members are from all around the world.

All the above-disclosed games are just a few snapshots of applications showing what could be achieved in resource or action based virtual communities. Without disturbing users' web surfing experience, people can also enjoy the fun of the game while browsing the Internet. All the games are executed through the Internet and allow all people from the world to participate. With all people who are accessing the same resource or performing the same actions automatically form the community based on that particular resource or action, they also form a small dynamic society. In that small society, any other types of group games, multi user games, peer to peer games or social games are also possible as long as the server is able to provide such games. For example, any two or more members in the community can play online chess or card games. Other types of social games or multi-user games like police and thief game, social killer game, can also take place inside this community.

Inside the resource or action based communities and during the progress of the game, marketing material or advertisements can be inserted at any time by the community server. Actually the games mentioned above may be marketing tools to advertise the resource and action based communities and the community systems. For example, during the game, targeted advertisements can also be inserted to the community home page so all participants or views can see it. In addition advertisers' web sites can be used to host answers to some questions or hints to some tasks. Only after visiting the advertiser sites and gathering the information necessary to complete the tasks or answer questions, the participants can then return to their original virtual community to submit their responses to the questions in order to achieve the final goal of the game.

Also in all the games, security is guaranteed by the virtual community servers to ensure that all members remain their unique identity during the session of the game. No one will be allowed to change their ids in the middle of the game, as it will disrupt the game. This can be enforced by asking the user for their login name at the beginning of the game and then preserving the user id and other profile information in the various community properties or into web cookies. In addition to security, users' privacy shall also be enforced as well to ensure that no private information is revealed to the outside without permission.

It is apparent that the above embodiments may be altered in many ways without departing from the scope of the invention. For example, the system and method of the invention may be used to enable participation of users in activities other than games. Further, various aspects of a particular embodiment may contain patentably subject matter without regard to other aspects of the same embodiment. Still further, various aspects of different embodiments can be combined together. Accordingly, the scope of the invention should be determined by the following claims and their legal equivalents.

What is claimed is:

1. A method of multi-user online games for a plurality of users browsing the Internet without disturbing users' web surfing experience comprising the steps of:
   a plurality of users accessing or taking an action upon an arbitrary web page in the Internet;
   tracking each of the plurality of users' web pages accessed or actions taken in the Internet; and
   creating a corresponding virtual community to said web page accessed or a particular action taken by at least one of the plurality of users in the Internet;
   adding all users who access the same particular web page or who take the same particular action in the Internet at the same time to the same virtual community corresponding to said web page;
   dividing users from all the virtual communities into a plurality of collaborative or competing teams;
   providing activities associated with each of said web page for users to interact or compete with users in the team;
   and assigning collaborative or competing tasks to said teams to compete wherein one of the tasks is to ask the team members to set up a web site and see which team attracts more visitors in a given period.

2. The method of claim 1, wherein said activities comprises finding other users having similar interests based on their tracked web pages accessed or actions taken in the Internet.

3. The method of claim 1, wherein said activities comprises a scavenger hunt game between teams.

4. The method of claim 1, wherein users are allowed to gain experience or earn credits while they are surfing the Internet.

5. The method of claim 1, further comprising a step of engaging a war game between the at least two teams, and battles of the war being engaged when participants in opposing groups accessing a same web page.

6. The method of claim 1, further comprising a step of displaying marketing material or advertisements to the users based on the activities and web pages being accessed.

7. The method of claim 1, wherein the tasks require team members to access a same web page to complete.

8. The method of claim 1, wherein members of said teams could further organize together to form different groups and subgroups for fighting.

9. The method of claim 1, wherein one user is able to virtually kill users from the competing team and earn credits while they both are visiting the same web page at the same time.

10. The method of claim 1, wherein the ability to kill is determined by earned credit of the user.

11. The method of claim 1, wherein one winner user is selected in a given period by users of the virtual communities.

12. The method of claim 1, wherein the progress of the tasks is broadcast in real time to the Internet users.

13. The method of claim 1, wherein one of the tasks can be selected from among any type of group games, multi-user games, peer to peer games or social games for users to play and compete.

14. The method of claim 1, wherein a user can be punished if his ability is not demonstrated.

15. A multi-user online game system for a plurality of users browsing the Internet without disturbing users' web surfing experience comprising a virtual community server operable of:
   while a plurality of users accessing or taking an action upon an arbitrary web page in the Internet, tracking each of the plurality of users' web pages accessed or actions taken in the Internet; and
   creating a corresponding virtual community to said web page accessed or a particular action taken by at least one of the plurality of users in the Internet;
   adding all users who access the same particular web page or who take the same particular action in the Internet at the same time to the same virtual community corresponding to said web page;
   dividing users from all the virtual communities into a plurality of collaborative or competing teams;
   providing activities associated with each of said web pages for users to interact or compete with other users in the team;
   and assigning collaborative or competing tasks to said teams to compete wherein one of the tasks is to ask the team members to set up a web site and see which team attracts more visitors in a given period.

16. The system of claim 15, further comprising: assigning collaborative or competing tasks to said teams to compete.

17. The system of claim 16, wherein the tasks require team members to access a same web page to complete.

18. The system of claim 15, wherein said activities comprises finding other users having similar interests based on their tracked web pages accessed or actions taken in the Internet.

* * * * *